United States Patent [19]

Sonnendorfer et al.

[11] Patent Number: 5,406,271
[45] Date of Patent: Apr. 11, 1995

[54] SYSTEM FOR SUPPLYING VARIOUS DEPARTMENTS OF LARGE SELF-SERVICE STORES WITH DEPARTMENT-SPECIFIC INFORMATION

[75] Inventors: Horst Sonnendorfer; Franz Wieth, both of Eichenau, Germany

[73] Assignee: SYSTEC Ausbausysteme GmbH, Eichenau, Germany

[21] Appl. No.: 904,365

[22] Filed: Jun. 26, 1992

Related U.S. Application Data

[63] Continuation-in-part of Ser. No. 632,207, Dec. 21, 1990, abandoned.

[30] Foreign Application Priority Data

Dec. 23, 1989 [DE] Germany .................. 39 42 939

[51] Int. Cl.⁶ .............. G06F 3/147; G06F 17/60; G08B 5/22; G09F 21/04
[52] U.S. Cl. .............. 340/825.35; 340/825.36; 364/401
[58] Field of Search .............. 340/825.35, 825.36, 340/825.32, 825.39; 364/400, 401, 710.04

[56] References Cited

U.S. PATENT DOCUMENTS

| | | | |
|---|---|---|---|
| 3,287,841 | 11/1966 | Spragg et al. | 40/308 |
| 3,677,570 | 7/1972 | Hedu | 40/308 |
| 4,325,146 | 4/1982 | Lennington | 340/825.54 |
| 4,750,151 | 6/1988 | Baus | 364/400 |
| 4,766,295 | 8/1988 | Davis | 364/464.01 |
| 4,773,175 | 9/1988 | Larsen | 40/308 |
| 4,882,724 | 11/1989 | Vela et al. | 340/825.35 |
| 4,888,709 | 12/1989 | Revesz et al. | 340/825.35 |
| 4,930,795 | 6/1990 | Tannehill et al. | 40/308 |
| 4,962,466 | 10/1990 | Revesz et al. | 340/825.35 |
| 4,973,952 | 11/1990 | Malec et al. | 364/400 |
| 5,260,867 | 11/1993 | Maeser et al. | 364/401 |
| 5,287,266 | 2/1994 | Malec et al. | 364/401 |

FOREIGN PATENT DOCUMENTS

| | | |
|---|---|---|
| 0133235 | 2/1985 | European Pat. Off. |
| 0170194 | 2/1986 | European Pat. Off. |
| 0176959 | 4/1986 | European Pat. Off. |
| 2596902 | 10/1987 | France |

Primary Examiner—Donald J. Yusko
Assistant Examiner—Mark H. Rinehart
Attorney, Agent, or Firm—Browdy and Neimark

[57] ABSTRACT

A system shopping cart for use in multi-department self-service stores is shown and described. The cart includes a digital memory for storing information specific to a department. Information is transferred to the cart by infrared light transmission coming from transmitters located in each department. The cart includes a display which provides a visual message for the cart user, and also includes an infrared transmitter for transmitting information to a department infrared transceiver for the purpose of identifying cart location and time for the purpose of customer shopping pattern analysis.

5 Claims, 2 Drawing Sheets

SYSTEM FOR SUPPLYING VARIOUS DEPARTMENTS OF LARGE SELF-SERVICE STORES WITH DEPARTMENT-SPECIFIC INFORMATION

This is a Continuation-in-part of parent, now abandoned, application Ser. No. 07/632,207 filed Dec. 21, 1990, the contents of which are incorporate herein by reference.

FIELD OF THE INVENTION

The invention relates to a system for supplying department-specific information to customers, who are equipped with system shopping carts, in different departments of a large self-service store. In addition, the system provides means for assessing where and when customers utilize the system.

BACKGROUND OF THE INVENTION

Conventionally, large self-service stores inform customers of particularly attractive offers, special sales, new products, and so forth, by centrally controlled announcements over loudspeakers distributed throughout the store. These loudspeaker announcements are often continuously repeated in the same order and over a period of time to the point that they annoy customers who become resistant to purchase of the items being announced.

Further, some stores also use transmitters in departments that are to be supplied with specific information for that particular department. From these transmitters, the information intended for the particular department is transmitted wirelessly to receivers that are housed on all the system shopping carts in the store. The information received is then acoustically reproduced over loudspeakers and/or shown on relatively large screens, which are likewise provided on the system shopping carts and are connected to the receivers on the system shopping carts. However, when customers stopping in one department are subjected to information announced over the system shopping cart loudspeaker specific to another department, they can be just as annoyed as by central loudspeaker announcements.

Further, when screens are attached near the pushbars of the system shopping carts, their size can be a nuisance, on the one hand; on the other, the equipment for triggering the screen and supplying it with the requisite energy requires considerable space, thereby restricting the already relatively limited space in the system shopping cart.

Conventionally, data required to prepare a so-called customer route study have been collected by surveillance of a significant number of persons over a prescribed period of time, either by observing or polling individual customers. These studies make it possible to determine, for instance, preferred customer routes through the self-service store; whether the customer will frequent, or has frequented, certain so-called service shops; how long the customer stays in different departments; and so forth. The facts gained by observation or polling are then recorded on prepared questionnaires or in table form, or dictated onto tape, for example.

Preparing for and carrying out such studies in the form of observations, polling and the like, are not only extremely time-consuming and thus labor-intensive, but in such polls of customers, one must also depend very heavily on the good will and cooperation of the individual customer and on his/her readiness to answer the questions asked with accuracy and detail. Despite the heavy expenditure of time and labor needed, the facts and results obtained in this way still have a variable amount of intrinsic uncertainty; the customer route study to be prepared, or prepared later, therefore necessarily often produces incorrect results that do not fully correspond to actual facts.

SUMMARY OF THE INVENTION

It is therefore the object of the invention to create a system and an apparatus for supplying customers shopping in a preselected number of different departments of a large self-service store information that is specific to a particular preselected department in which they are shopping. This specific information can be quickly changed and is made individually accessible to the customer only while the customer is shopping in the department corresponding to the specific information. Further, each time the specific information is transmitted, it is counted and recorded to determine the number of transmissions in the corresponding department.

In addition to the display of department-specific information, the system can ascertain and record the customer route taken through the store and the period of time each system shopping cart remains in a different department.

In the preferred embodiment of the system according to the invention, the information specific to each preselected department is first stored in a memory for later distribution to the corresponding department. This is accomplished by a mobile unit having an interconnected computer and a second infrared transceiver. The computer has a memory diskette for storing information specific to each of the preselected different departments. The information specific to each preselected department is stored in a memory diskette on the mobile unit and then serially delivered to a first infrared transceiver having a memory located in the corresponding department. The output of the information is delivered at a specific predetermined cycle, for example with a transmission rate of 125 kilobits per second by the infrared transceiver on the mobile unit.

After the information specific to each preselected department has been transmitted to the first infrared transceiver in the corresponding department, the first infrared transceiver is programmed to transmit the department specific information to a system shopping cart entering the department. These system shopping carts are each provided with a third infrared transceiver having a buffer memory to receive and store bitwise the specific information transmitted by the first infrared transceiver.

Thereafter, the stored information is made visible to the customer by playback on a display on each third infrared transceiver in the department. The display on the third infrared transceiver is mounted in the field of view of the customer, on the top front edge of the basket of the system shopping cart. The department-specific information is generally shown only once on a system shopping cart during the time a customer spends in the department. The system according to the invention also assures, by suitable monitoring and by the transmission mode used, that the information offered will be displayed only once, from the beginning, without any omissions or truncations. For instance, the information received is canceled from the memory of the third infrared transceiver after a certain period of time, or it may remain stored in the memory of this infrared transceiver for possible repetition until such time that the customer moves the system shopping cart into another department.

Preferably, at about the same time as or immediately after each visual playback of information on a display, an encoded signal indicating receipt of the output of information by the first infrared transceiver to the third infrared transceiver can be transmitted back to the first infrared transceiver for recordation and storage in its memory. Each time information is played back in full on a display, the signal transmitted by infrared light provides confirmation and thus a return acknowledgement that the information specific to this department was not only received by the third infrared transceiver mounted on each system shopping cart but was also visibly displayed thereon.

The number of confirmation signals received in each preselected department is recorded in the memory associated with the first infrared transceiver with a department-specific code—in such a way that it can be called up. From these confirmation signals, which can be called up and received by means of the second infrared transceiver on the mobile unit, a log is created in the memory of the computer from which it can be determined how often and where information has been passed on to customers over the displays on the system shopping carts. Furthermore, the third infrared transceiver provided on the system shopping carts are provided with a code number, which is either automatically broadcast or are sampled by activation of the first infrared transceivers in the preselected departments of the store to determine a customer's route. The time and date of reception can be assigned to all the information broadcast by the third infrared transceiver on the system shopping cart, including the code number of the cart, or to all the information received in the first infrared transceiver. With recordation of the time of reception along with the code number of a system cart, a conclusion can be drawn as to how long a customer remains in different departments, or under some circumstances how long the customer looks at specific articles or groups of articles.

Further, a location identification code can also be allocated to the first infrared transceivers located in the preselected departments, which is broadcast over its infrared path to each of the third infrared transceivers on system shopping carts that reach such departments. In this case, the memory associated with the third infrared transceivers on the system shopping carts is used to store these location identification codes. This enables use of appropriate sampling or scanning devices only at the exits of the preselected departments, or possibly in the region of the cash registers. Collected data temporarily stored in the third infrared transceiver of the system shopping cart can then be sampled and transferred in a local memory and from it sent at regular intervals for evaluation and further processing. Once the data have been extracted from the memory of the third infrared transceiver on the system shopping cart, the memory is erased, making it immediately ready for use once again and capable of again storing data.

The invention will now be described in further detail in terms of a preferred embodiment, referring to the accompanying drawings.

BRIEF DESCRIPTION OF THE DRAWINGS

FIG. 4b shows a sectional view through the infrared transceiver of FIG. 4a.

DETAILED DESCRIPTION OF THE PREFERRED EMBODIMENTS

Figure 1:
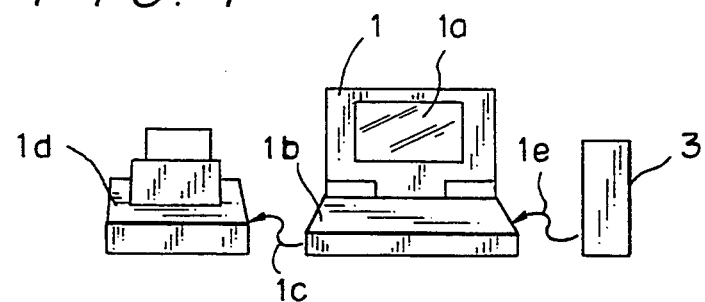
FIG. 1 schematically shows a laptop computer to which a second infrared transceiver unit is connected with an auxiliary printer arrangement connected to the laptop.

The invention relates to a system for supplying department-specific information to customers equipped with system shopping carts, in different departments of a large self-service store. In addition, the system provides means for assessing where and when customers utilize the system.

To these ends, information from infrared transceiver units 5 installed at a height of from 2.5 to 4 m, in a preselected number of departments 2 of a self-service store, is transmitted along with signals for system control along infrared rays 6. This information is received by infrared transceiver units 8 mounted on system shopping carts and displayed by means of liquid crystal displays (LCDs) of the infrared transceivers 8. Each infrared transceiver 8 with LCD 9 is mounted for this purpose within the field of view of a customer, on the top front edge of a basket 7c of each system shopping cart 7. There are from one to four lines, each for 40 alphanumeric characters per line, available in each LCD 9, with one line displayed after another. The manager of the self-service store can decide whether and in what order the lines should be repeated, whether a line should appear immediately or be developed slowly, and/or whether a line should flash.

A memory or filing system is provided in the infrared transceivers 5 mounted in the preselected number of departments 2, to store the number of times during a determined period the information broadcast has in fact been shown on a display 9. To this end, the satisfactory reception and in particular the satisfactory playback of the information on the display 9 is signaled to the applicable infrared transceiver 5 by the infrared transceiver 8 mounted on the system shopping cart 7, along infrared path 6'.

The time is also recorded in a filing system portion of the memory of infrared transceiver 5 every hour on the hour, thus creating a billing file which calculates leased time for billing an advertiser. This filing system thereby permits the self-service store manager to negotiate billing to the advertiser on the basis of either the leased time or how many displays are actually shown on the display equipment 9.

With the aid of the information system according to the invention, a so-called electronic customer route study can be made. To this end, the infrared transceivers 8 mounted on the system shopping carts, with the associated displays, are consecutively numbered electronically. The number of each infrared transceiver 8 can be called up by the infrared transceivers 5 mounted in the preselected number of departments 2 and then is stored in them along with the time and date, in an acknowledgement file in the filing system. Thus, from installation of the infrared transceivers 5 in the preselected number of departments 2, it can be ascertained when a given system shopping cart 7 visited a given department 2.

The information system according to the invention comprises three basic components, namely 1) a mobile computer in the form of a laptop 1, to which an infrared transceiver unit 3 is connected; 2) an infrared transceiver unit 5 with a memory installed in a preselected number of departments; and 3) a number of infrared transceivers 8 with LCD displays and memory provided in them, to be installed on system shopping carts. The functions of the three basic components of the information system will now be described in detail.

As can be seen from the schematic illustration in FIG. 1, the laptop computer 1 has a screen 1a, represented by a rectangle, and a schematically shown control panel 1b. The laptop computer 1, which is an MS DOS-type computer, for instance, comprises a 512K main memory, a 20 megabyte hard disk, and a 3.5-inch drive for 720 kb diskettes, again as an example. A printer 1d can be connected via a cable 1c to the laptop computer 1 to print out information in the computer memory after its collection, on cart 7', as further explained below. The laptop 1 is connected to the infrared transceiver unit 3 over a further cable 1e.

With the aid of the software installed on the hard disk of the laptop computer 1, the manager of a self-service store, a hypermarket or the like can put the information ultimately intended for infrared transceivers 8 having displays into the desired form and with a desired format. For this purpose, the mobile laptop computer 1 sends a stored password to the infrared transceiver 5 to verify its access authorization. With the aid of the laptop computer 1 the files can also be read out and stored in the laptop computer 1. After formatting of the various information, it can also be decided whether data for billing, on the basis of the information actually displayed, and/or additional data for analysis should be collected from the infrared transceiver 5 installed in the preselected number of departments 2.

Figure 2:
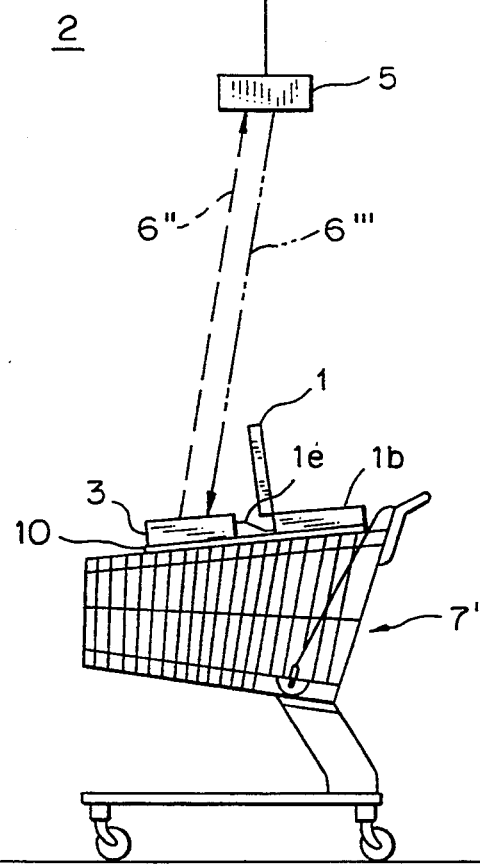
FIG. 2 schematically shows the laptop computer and the second infrared transceiver unit of FIG. 1 on a shopping cart communicating with a first infrared transceiver unit in a department of a self-service store.

The laptop computer 1 can now communicate with the infrared transceiver 5 via infrared light. As shown in FIG. 2, a manager can operate a laptop computer 1 and the infrared transceiver unit 3 on a portable tray 10 placed on top of a mobile shopping cart 7'. This mobile cart 7' permits the infrared transceiver 3 to be aligned with any of the infrared transceivers 5. The manager also has both hands free to operate the laptop computer 1.

With the aid of a transmission command, the applicable information, and formatting and operating instructions can be transmitted to the infrared transceiver unit 3 over the cable 1e. From the infrared transceiver unit 3, when installed on mobile shopping cart 7' with tray 10, the applicable information and the corresponding instructions can be stored directly in each of the infrared transceivers 5 intended for this purpose in the preselected number of departments 2.

The infrared transceiver unit 3 engaged to the mobile laptop computer 1 transported on mobile shopping cart 7' serves to exchange data between the laptop computer 1 and the infrared transceivers in the preselected number of departments 2, so that expensive hard wiring between a central station and the individual infrared transceiver units is avoided.

The data are entered into the infrared transceiver by the laptop computer 1. For this purpose, a password stored at the beginning of the program is automatically compared with the password stored in the infrared transceiver 5 to verify the access authorization of the manager to the infrared transceiver 5. This password is preset by the manufacturer but can be modified by the manager at any time. Once the access authority has been acknowledged, the data are sent to the infrared transceiver 5. When this has been done, the infrared transceiver 5 "looks for" the data valid at that time. When an infrared transceiver 8 enters the transmitting region, the data are transmitted. Afterwards, satisfactory reception is confirmed by the infrared transceiver 8.

The infrared transceiver 8, having a display 9, is used to display the data transmitted by an infrared transceiver 5. It acknowledges satisfactory transmission of the data.

As schematically shown in FIG. 2, infrared transceiver unit 3, transmits the information along with the formatting instructions along infrared rays 6" indicated by a broken arrow, to the infrared transceiver unit 5 installed in the applicable department. The transmission from infrared transceiver 5 then can be made repeatedly after being triggered by a system shopping cart 7 entering a particular department.

The information stored in the memory of the infrared transceiver 5 can likewise be received by infrared transceiver unit 3 along infrared rays 6"' for monitoring purposes. Thus, the aforementioned billing file can be retrieved at any time from laptop computer 1 after collection from all the infrared transceivers 5 by infrared transceiver 3. After a successful transmission to infrared transceiver 3, the data file in the applicable infrared transceiver 5 is suitably erased, so that the data collected are then available only in the memory of laptop computer 1.

If the laptop computer 1 is to be used to prepare for an analysis, then the infrared transceivers 5 are numbered with consecutive location identification numbers, with the aid of the infrared transceiver unit 3, so that later, to prepare the analysis, the location identification numbers of the various infrared transceivers 5 can be read out again. Consecutive numbering of all the infrared transceivers 5 is absolutely necessary in order that the data files stored in the various infrared transceivers 5 can be accurately delivered to a specific department 2, in the store layout of a self-service store, supermarket, hypermarket or the like.

The infrared transceiver unit 3 of the laptop computer 1 can also be used at any time to adjust a clock provided in the infrared transceivers 5, via the infrared path 6", so that the laptop computer 1 is also assigned the function of a master clock. Both to prepare an analysis and merely for functional monitoring, the acknowledgement data file prepared in the various infrared transceivers 5 can be called up at any time by these infrared transceivers, and delivered to the infrared transceiver unit 3 of the laptop computer 1 via the infrared path 6"' and suitably automatically stored at the same time into the laptop computer 1.

The various infrared transceivers 5 serve on the one hand to transmit information to the infrared transceivers 8, with the displays provided in them, mounted on system shopping carts 7, and on the other hand for developing the aforementioned billing and acknowledgement data files. The various infrared transceivers 5 are installed in the preselected number of departments 2 for which they are specifically intended, for instance being hung at a height of 2.5 to 4 m. Either a main power unit (not shown) or a charge unit (likewise not shown) is provided for these infrared transceivers 5. In normal use, the infrared transceivers 5 have at least approximately four weeks of battery backup.

By means of the infrared transceiver unit 3 of the laptop computer 1 on mobile shopping cart 7', the information to be broadcast to the particular department 2 is stored in the infrared transceiver 5 provided there. Once this has been done, the infrared transceiver 5 automatically begins to transmit both its number, in the form of the location identification number, and the operating and formatting instructions. As soon as the reception of the number and the other instructions has been acknowledged by an infrared transceiver unit 8 mounted on a system shopping cart 7, the special information intended for the particular department is transmitted. Satisfactory reception is then confirmed by the applicable infrared transceiver 8. As already mentioned, if necessary, a billing data file can be developed with these confirmations, and can then be called up at any time using the infrared transceiver unit 3 of the laptop computer 1. The number of the applicable infrared transceiver 5, in the form of its location identification number, and the information broadcast to it are then transmitted jointly, automatically, so as to preclude mistakes. (Once satisfactory reception has been signaled by the infrared transceiver unit 3, the data file that has just been called up is canceled in the applicable infrared transceiver unit 5.)

In order to enable sending the same information to departments that cover a large area, 10 infrared transceivers can be wired together, with any arbitrary infrared transceiver unit 5 forming the starting point. The rest of the infrared transceivers 5 are then connected in series via synchronizing cables to the infrared transceiver 5 acting as the starting point.

Each of the infrared transceivers 5 can be used for pure analysis, or for analysis combined with information transmission. To do so, however, a memory expansion must be made for each infrared transceiver 5, so that the location identification number and the various operating and formatting instructions can be programmed in along with the information, by means of the infrared transceiver unit 3 of the laptop computer 1 on mobile shopping cart 7'. As soon as the transmission from the infrared transceiver unit 3 to the applicable infrared transceiver 5 has been effected, the infrared transceiver broadcasts both its number, in the form of the location identification number, and the operating and formatting instruction. As soon as these data have been acknowledged, with the code number of the unit, by an infrared transceiver unit 8 mounted on a system shopping cart 7, the code number of the acknowledging infrared transceiver 8 is stored in memory along with the time in the acknowledgement data file referred to initially.

Figure 3:
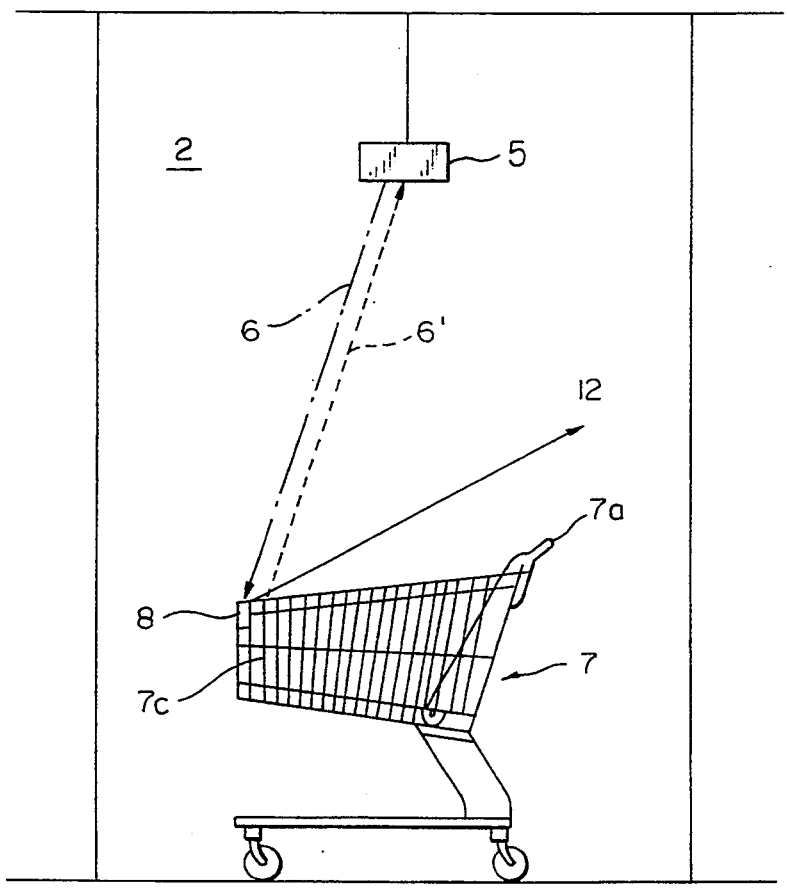
FIG. 3 schematically shows the first infrared transceiver unit of FIG. 2 communicating with a third infrared transceiver unit with display provided on a system shopping cart.

Since information is generally stored in the applicable infrared transceiver 5, it is then transmitted to this infrared transceiver 8 over the infrared path 6 (FIG. 3). In that case, an indication then can be made on the laptop computer 1 to which the infrared transceiver unit 3 is connected over the cable 1e that the infrared transceiver 5 has been set to the analysis mode. The acknowledgement data files stored in memory in the infrared transceivers 5 can be read out by means of the infrared transceiver unit 3 of the laptop computer 1, and are then automatically immediately stored in the laptop computer 1. If there is a computer-controlled linkage of all the acknowledgement data files, a customer route study can then be made.

The display 9 provided in each infrared transceiver 8 serves to display the information transmitted by an infrared transceiver 5. The infrared transceivers 8 also acknowledge satisfactory reception of the operating and formatting instructions and of the transmitted information, along with the code number of a particular unit, which was either assigned to it at the factory or input by means of the infrared transceiver unit 3 of the laptop computer 1.

Figure 4A:
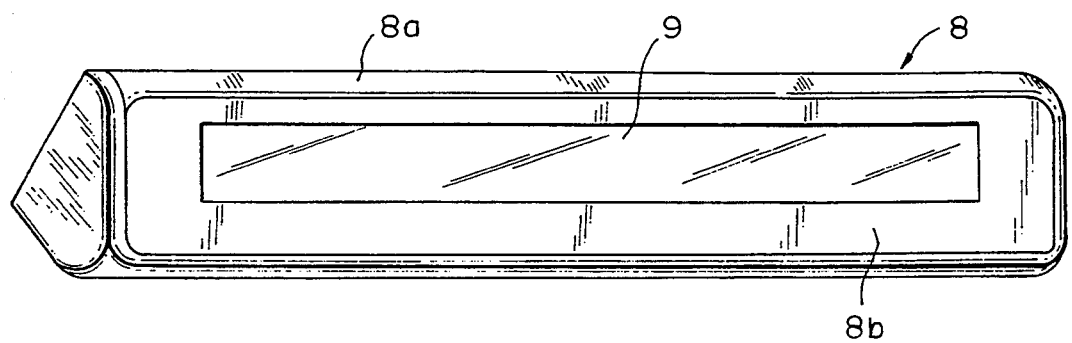
FIG. 4a shows a schematic front view of the third infrared transceiver unit of FIG. 3 with a display.
Figure 4B:
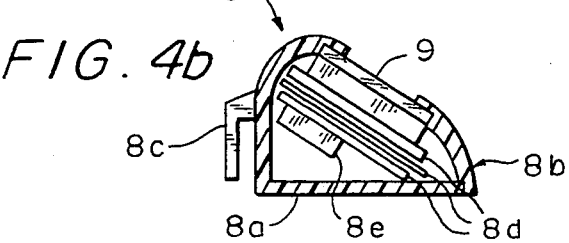

As can be seen from FIGS. 4a and 4b, each infrared transceiver 8 is mounted inside a basket 7c of a system shopping cart 7 (FIG. 3), on the top front edge of the basket precisely opposite the pushbar 7a of each system shopping cart 7, with the aid of a special tool (not shown) by means of a hook-like L-shaped attachment 8c embodied on the back of its housing 8a, and is aimed in such a way that the front 8b of the housing containing the display 9 in the form of an LCD module is oriented toward the field of view of a customer pushing the system shopping cart 7, as indicated in FIG. 3 by an arrow 12. Each infrared transceiver 8 also has a printed wiring board 8d, shown in FIG. 4b, and an electronics module 8e including the necessary electronic memory cooperating with infrared transceiver 8. Each of the infrared transceivers 8 mounted on system shopping carts 7 draws energy from batteries, not shown further here, which are recharged by the ambient light with the aid of solar cells, likewise not shown. As a result, every infrared transceiver unit 8 mounted on a system shopping cart 7 and having a display 9 is immediately ready for use.

As soon as an infrared transceiver 8 enters the vicinity of an infrared transceiver unit 5, the infrared transceiver 8 acknowledges the satisfactory reception of the operating and formatting instruction by broadcasting its number. Typically, the infrared transceiver 5 will then broadcast the information stored in it, which is transmitted by infrared rays 6 to the infrared transceiver 8 located in its vicinity and stored in that unit.

This means that the customer does not need to remain below an infrared transceiver 5 in order to receive the complete information. The infrared transceiver 8 checks for defective transmission of the information and confirms it. Not until satisfactory reception of the information has been confirmed by the infrared transceiver 8 is the information, transmitted over the infrared path, shown on its display 9 in accordance with the formatting instructions.

To this end, in the infrared transceiver 8, the information is shifted into a shift register, for instance with a clock frequency of 16 kHz. After every eight (8) bits of information shifted in, a clock pulse is generated, and as a result this byte of information, now present in parallel form in the ASCII format, is shifted into the display 9. This course of events now takes place another 79 times in succession, for example, so that in this case 80 alphanumeric characters are displayed, for instance in two lines. The output formatting is generated by the electronics of the infrared transceiver 8.

The foregoing description of the specific embodiments will so fully reveal the general nature of the nvention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A system for supplying a preselected number of different departments of a large self-service store with department-specific information, said system comprising:

a plurality of system shopping carts moveable between a plurality of different departments of a large self-serve store;

a first infrared transceiver (5) with a memory, located in each of a preselected number of said plurality of different departments (2), each said first infrared transceiver responsive to encoded infrared signals to store information in said memory, to transmit said stored information from said memory by encoded infrared signals, and to store information confirming receipt of said transmitted information in said memory;

a mobile cart;

information storage, delivery and collection means for a) storage of department-specific information for each of said preselected number of different departments, b) respective delivery along a first infrared path (6″) of said department-specific information to each corresponding first infrared transceiver (5) and c) collection along a second infrared path (6‴) of information confirming receipt of said department-specific information by system shopping carts (7) entering said preselected number of different departments;

said information storage, delivery and collection means comprising a computer (1) and a second infrared transceiver (3) mounted on said mobile cart to permit said information storage, delivery and collection means to be physically moved between said preselected number of said plurality of different departments for delivery of said department-specific information to each said first infrared transceiver corresponding to each said different department and collection of information confirming receipt of said department specific information by said system shopping carts; and a third infrared transceiver (8) having a display and an internal memory mounted on each of said plurality of system shopping carts (7) on a front upper edge of baskets of said system shopping carts (7);

wherein said first infrared transceiver (5) delivers said department-specific information to said third infrared transceiver (8) along a third infrared path (6) for activating said display in a predetermined cycle on entry of one of said plurality of system shopping carts (7) into one of said preselected number of different departments.

2. The system according to claim 1, wherein said third infrared transceiver (8) transmits confirmation of each activation of said display by said department-specific information along a fourth infrared path (6′) to said first infrared transceiver unit (5).

3. The system according to claim 1, wherein said display (9) is a four-line display for 40 alphanumeric characters per line.

4. The system according to claim 1, wherein said third infrared transceiver (8) automatically transmits a code number via said fourth infrared path to said first infrared transceivers (5).

5. The system according to claim 1, wherein said first infrared transceivers (5) broadcast a location identification code over said third infrared path to each of said third infrared transceivers (8) and each said third infrared transceiver (8) utilizes said internal memory for storing the location identification code of said first infrared transceiver (5).

* * * * *